(12) United States Patent
Cronin

(10) Patent No.: US 11,245,611 B2
(45) Date of Patent: Feb. 8, 2022

(54) ANALYSIS OF ROUTING POLICY APPLICATION TO ROUTES

(71) Applicant: Arista Networks, Inc., Santa Clara, CA (US)

(72) Inventor: David Cronin, Dundalk (IE)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 15/930,142

(22) Filed: May 12, 2020

(65) Prior Publication Data
US 2021/0359929 A1 Nov. 18, 2021

(51) Int. Cl.
*G06F 15/16* (2006.01)
*H04L 12/751* (2013.01)

(52) U.S. Cl.
CPC ................... *H04L 45/02* (2013.01)

(58) Field of Classification Search
CPC ........................................ H04L 45/02
USPC ........................................ 370/254; 709/200
See application file for complete search history.

(56) References Cited

U.S. PATENT DOCUMENTS

| | | | | |
|---|---|---|---|---|
| 7,082,102 B1* | 7/2006 | Wright | ........ | H04L 41/0893 370/229 |
| 7,263,552 B2* | 8/2007 | Govindarajan | ..... | H04L 41/0213 370/254 |
| 8,135,815 B2* | 3/2012 | Mayer | ........ | H04L 41/0873 709/223 |
| 8,165,023 B2* | 4/2012 | Khalid | ........ | H04L 45/02 370/235 |
| 8,489,721 B1* | 7/2013 | Gokhale | ........ | H04L 45/02 709/223 |
| 10,291,473 B2* | 5/2019 | Joshi | ........ | H04L 41/0893 |
| 10,887,223 B1* | 1/2021 | Sharma | ........ | H04L 45/48 |
| 2006/0182038 A1* | 8/2006 | Nalawade | ........ | H04L 45/028 370/252 |
| 2009/0028068 A1* | 1/2009 | Chen | ........ | H04L 45/50 370/254 |
| 2010/0111093 A1* | 5/2010 | Satterlee | ........ | H04L 45/50 370/401 |

(Continued)

OTHER PUBLICATIONS

Li et al., "BGP-Grid: A distributed BGP policy simulation and evaluation system", 2010 3rd International Conference on Biomedical Engineering and Informatics, vol. 7, IEEE, Oct. 16-18, 2010, pp. 2843-2848 (Year: 2010).*

*Primary Examiner* — Anthony Mejia
(74) *Attorney, Agent, or Firm* — Chamberlain, Hrdlicka, White, Williams & Aughtry

(57) ABSTRACT

Techniques described herein relate to performing an analysis of application of a routing policy to a route. Specifically, the techniques relate to a command that may be executed to evaluate the steps of the routing policy (e.g., a route map). A copy of a live route map may be made. Receipt of the command may cause the steps of the routing policy to be simulated using the copy. The simulation may return results of analyzing the outcome of each step in the routing policy. Based on the results, an updated routing policy copy may be generated that changes one or more steps in the routing policy. The updated routing policy copy may then be re-simulated to determine if the changes caused the intended effect. If so, the live routing policy may be replaced with the updated routing policy copy.

19 Claims, 3 Drawing Sheets

(56) References Cited

U.S. PATENT DOCUMENTS

| | | | | |
|---|---|---|---|---|
| 2013/0132542 A1* | 5/2013 | Zhang | ................... | H04L 45/04 |
| | | | | 709/223 |
| 2015/0089354 A1* | 3/2015 | Abrahami | ............ | G06F 16/958 |
| | | | | 715/235 |
| 2015/0256397 A1* | 9/2015 | Agarwal | ................ | H04L 49/25 |
| | | | | 370/254 |
| 2016/0234099 A1* | 8/2016 | Jiao | ................... | H04L 47/2441 |
| 2016/0283345 A1* | 9/2016 | Gounares | ............... | G06F 17/00 |
| 2017/0331692 A1* | 11/2017 | Hague | .................. | H04L 63/104 |
| 2021/0160169 A1* | 5/2021 | Shen | ...................... | H04L 45/02 |

\* cited by examiner

ANALYSIS OF ROUTING POLICY APPLICATION TO ROUTES

BACKGROUND

Network device often have routes that dictate, at least in part, where a given network traffic data unit should be sent. Such routes are often stored in a routing information base (RIB). Various entities (e.g., border gateway protocol (BGP) agents) may contribute route information to a RIB agent, which may, in turn, select routes to be installed in the RIB. Such routes may, or may not, be installed in a forwarding information base (FIB), or shared with neighbor network devices.

DETAILED DESCRIPTION

Figure 1:
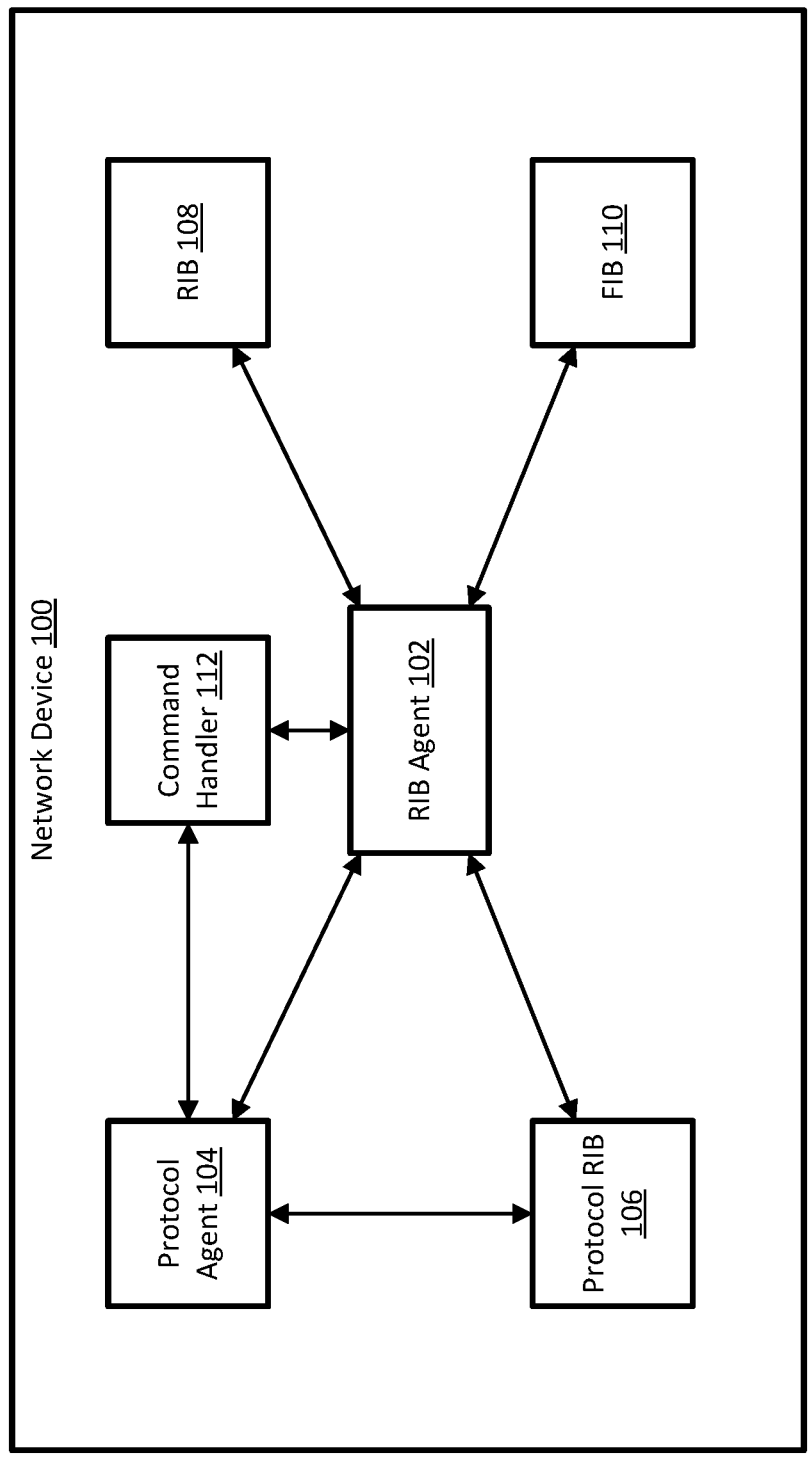
FIG. 1 shows a system in accordance with one or more embodiments described herein.

Specific embodiments will now be described with reference to the accompanying figures.

In general, embodiments described herein relate to techniques for analyzing application of routing policies to routes received from a neighbor network device and/or being shared with neighbor network device. In one or more embodiments, network devices using a routing protocol (e.g., border gateway protocol (BGP)) receive route information from peers (e.g., neighbor network devices). Such protocols may be used, for example, to share reachability information among autonomous systems (ASs) of a network (e.g., the Internet). Such routes may be evaluated by a best path (i.e., route) selection algorithm to determine whether they are the best route to add to the routing protocol RIB, after which they may be presented to a routing information base (RIB) agent, which may then determine if they should be included the RIB of the network device.

However, in one or more embodiments, before the route information is analyzed by the best path selection algorithm, a routing policy may be applied to the route information (e.g., by evaluating a route map for the route). In one or more embodiments, a route map is a series of sequences to be evaluated. In one or more embodiments, a sequence includes match statements (e.g., does the route information include a certain attribute that matches a certain value), set statements (e.g., to modify some attribute in the route information), and/or calls to sub-route maps, which may also have match and/or set statements. Additionally, in one or more embodiments, route maps may be applied to outbound routes that are to be shared with peer network devices to implement sharing policies (e.g., permit or deny sharing, modify before sharing).

The outcome of the application of a route map to route information is to: i) permit the route information to be presented to the best path selection algorithm or shared with a peer; ii) deny presentation of the route information to the best path selection algorithm or share the route information with a peer; and/or iii) cause the modification of one or more attributes of the route information before presenting the route to the best path selection algorithm or sharing route information with a peer.

In one or more embodiments, network device users expect that their network devices will perform in certain ways during normal operation (i.e., there is an expected behavior). For example, a network device user may have an expectation that route information for a given destination network would be provided by a given BGP peer, and that receipt of that route information to lead to the network device being able to send network traffic towards that destination network. For that to happen, the network device user expects that: (i) the route was selected by the BGP best path selection algorithm, (ii) the route was presented to the RIB agent, (iii) the route was selected by the RIB agent as the best path to that destination (e.g., it is better than routes from other protocols), (iv) the route was stored as a route entry in the RIB, and (v) the route was then ultimately stored in the FIB so that network traffic intended for the destination is forwarded to the appropriate next-hop device. If one or more steps of the aforementioned steps did not properly happen, then an unexpected outcome has occurred relative to the route information that was received. In one or more embodiments, an unexpected outcome may be referred to as an incorrect outcome.

Other examples of unexpected (i.e., incorrect) outcomes include, but are not limited to, a route getting through the aforementioned processing that was not expected to, a route not getting through the aforementioned processing that was expected to, a route being modified in an unexpected way, an outbound route being shared with a peer when it should not have been, a route not being shared with a peer when it should have been, a route being shared with a peer with an unexpected modification, or any combination thereof.

In one or more embodiments, a network device user may determine that the an unexpected outcome has occurred, and that such an outcome occurred because of something that occurred during the application of a routing policy to the route information (e.g., the route was unexpectedly denied by a route map being applied to the BGP peer from which the route information was received). However, there currently is no way to determine exactly why the route map caused the unexpected outcome, making debugging a route map difficult, other than manually assessing a route map, which may be time consuming (at best) or practically impossible (at worst) for a network device user due to the large number of steps in a particular routing policy.

Embodiments described herein solve the aforementioned problem by providing network device users a new command (e.g., a new command line interface (CLI) command). Such a command may, for example, be "show BGP debug policy". In one or more embodiments, the new command allows specification of various options. Examples of such options include, but are not limited to: specification of a certain neighbor (e.g., a BGP peer), various route attributes (e.g., ipv4, unicast, etc.), a route map to apply, and/or a virtual routing and forwarding (VRF) instance. In one or more embodiments, a network device user entering the command also enters a prefix relevant to the route for which the routing policy analysis is to occur. In one or more embodiments, not specifying certain options may lead to default selections to be made. For example, not specifying a neighbor may default to analysis for all neighbor devices, not specifying a VRF may lead to analysis being performed using a default VRF, not specifying a route map may lead to analysis that yields the route map actually used on the route, which is then used for the subsequent analysis, etc.

In one or more embodiments, when a network device user enters the new command, a command handler collects the appropriate information from the relevant protocol agent (e.g., a BGP agent) about the route information and/or the routing policy (e.g., route map) that was applied.

Next, in one or more embodiments, the code path of the routing policy (e.g., route map) is simulated to determine what happens at each step (e.g., each route map sequence) during evaluation of the routing policy. The results are then displayed to the network device user (e.g., in a console window). In one or more embodiments, the results include a statement of the prefix and the peer from which it was received, the name of the routing policy (e.g., route map) applied, and the results of each step (e.g., each route map sequence in the route map). In one or more embodiments, the results of a given step (e.g., route map sequence) may include whether any match statements matched or not, whether any set statements were triggered, the results of calling a sub-route map, and what happened after the route map sequence was completed (e.g., move to next sequence).

In one or more embodiments, by using this new command, a network device user may see exactly what step during the application of a routing policy caused the unexpected outcome to occur. In one or more embodiments, with such information, the network device user may make a copy of the routing policy (e.g., route map), and modify the copy to try and fix the discovered problem that led to the unexpected outcome. In one or more embodiments, the command may be used again on the copy to see if the changes corrected the problem. In one or more embodiments, once the network device user is satisfied that the problem is resolved, the copy can be applied to the live system. In one or more embodiments, the debug process using the new command allows for debugging and testing without having to make changes to a live system, which can lead to unexpected and/or undesirable results.

FIG. 1 shows a network device in accordance with one or more embodiments described herein. Network device (100) shown in FIG. 1 is only one example of a particular network device. One having ordinary skill in the art, and the benefit of this Detailed Description, will appreciate that the techniques described herein may apply to any number of different network devices. Accordingly, embodiments described herein should not be considered limited to network device (100) shown in FIG. 1.

As shown in FIG. 1, network device (100) includes RIB agent (102), any number of protocol agents (e.g., protocol agent A (104)), any number of protocol RIBs (e.g., protocol RIB (106)), RIB (108) and FIB (110). Each of these components is described below.

In one or more embodiments, network device (100) is a physical device that includes and/or is operatively connected to persistent storage (not shown), memory (e.g., random access memory (RAM)) (not shown), one or more processor(s) (e.g., integrated circuits) (not shown), and at least one physical network interface (not shown) (which may also be referred to as a port), which may provide connections (i.e., links) to other devices (e.g., computing devices, other network devices, etc.). In one or more embodiments, network device (100) also includes any number of additional components (not shown), such as, for example, network chips, field programmable gate arrays (FPGAs) (not shown), application specific integrated circuits (ASICs) (not shown), indicator lights (not shown), fans (not shown), etc.

In one or more embodiments, network device (100) includes any software configured to perform various functions of the network device. Such software may, for example, execute using one or more processors of network device (100), or any other hardware resource of network device (100) capable of executing software. One example of such software is an operating system (OS) (not shown). In one or more embodiments disclosed herein, an OS includes any software and/or firmware for managing the resources (e.g., hardware, other software, etc.) of one or more network devices (e.g., network device (100)). More specifically, an OS may be a program or set of programs that manages all or any portion of the other software (e.g., applications, agents, etc.) in a network device (e.g., network device (100)), as well as all or any portion of the hardware of a network device. Management by an OS may include scheduling, hardware allocation, application execution, network access, management of access to stored files that are selectively made available to applications running on the OS, etc. An OS may also manage and enforce settings and permissions customized for specific applications running within the OS. In one or more embodiments, an OS provides an environment in which agents execute. Agents are discussed further below.

Examples of a network device include, but are not limited to, a network switch, a router, a multilayer switch, a fibre channel device, an InfiniBand® device, etc. A network device is not limited to the aforementioned specific examples.

In one or more embodiments, network device (100) includes functionality to receive network traffic data units (e.g., frames, packets, tunneling protocol frames, etc.) at any of the physical network interfaces (i.e., ports) of network device (100) and to process the network traffic data units. In one or more embodiments, processing a network traffic data unit includes, but is not limited to, a series of one or more table lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device.

In one or more embodiments, the network device is part of a network (not shown), and be operatively connected to any number of neighbor devices (e.g., peer devices for a given routing protocol). A network (not shown) may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, a network may be coupled with or overlap, at least in part, with a collection of autonomous systems (e.g., the Internet). In one or more embodiments, a network includes a collection of one or more devices (e.g., network device (100)) that facilitate network connectivity for one or more operatively connected devices (e.g., computing devices, data storage devices, other network devices, etc.) (not shown). In one or more embodiments, network device (100) and other devices within the network are arranged in a network topology (not shown). In one or more embodiments, a network topology is an arrangement of various devices of a network.

In one or more embodiments, the persistent storage and/or memory of network device (100) may be or include and/or be operatively connected to one or more data repositories (not shown) for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage and/or memory of network device (100) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of network device (100), cause the one or more processors and/or other hardware components to perform operations in accordance with one or more embodiments described herein.

Such software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, network device (100) includes any number of agents (e.g., RIB agent (102), protocol agent A (104)). In one or more embodiments, in one or more embodiments, an agent is any hardware (e.g., circuitry), software, firmware, or any combination thereof that includes functionality to perform any tasks or actions for which it was designed. Examples of agent functionality include, but are not limited to: monitoring hardware; monitoring other software; monitoring log files; receiving information; parsing information; writing information (e.g., to hardware tables); performing repetitive tasks (e.g., data backup, memory management, etc.); providing an environment for a user to interact, locally or remotely, with hardware and/or software components of network device (100); automatically adding data to certain types of fields; performing management functions; simulating other software and/or hardware; sending an/or receiving signals (e.g., beacon signals) to determine if a device is still in contact with another device; any other task or action; or any combination thereof.

An agent may be a process, or a part of a process, may include one or more threads within one or more processes, and/or may be capable of creating additional threads. An agent may be operatively connected to volatile storage devices and/or to non-volatile storage devices of network device (100). In one or more embodiments, an agent executes within an operating system (not shown) using one or more processors (not shown) of network device (100).

In one or more embodiments, a portion of the agents of network device (100) are protocol agents (e.g., protocol agent A (104)). In one or more embodiments, a protocol agent is an agent implementing a routing protocol (e.g., BGP). In one or more embodiments, a routing protocol is a protocol for managing route information in a network. For example, a routing protocol may learn route information from neighbor network devices, store such route information, share route information with other neighbor devices, provide candidate routes to a RIB agent (discussed below) for further processing, and/or request route information from other protocols from a RIB agent. In one or more embodiments, protocol agents are operatively connected to a RIB agent (discussed below).

Examples of protocol agents include, but are not limited to: a Border Gateway Protocol (BGP) agent; an Interior Gateway Protocol (IGP) agent (e.g., Open Shortest Path First (OSPF), Routing Information Protocol (RIP), Intermediate System to Intermediate System (IS-IS), Enhanced Interior Gateway Routing Protocol (EIGRP), etc.); a static route agent, etc.

In one or more embodiments, each protocol agent (e.g., protocol agent A (104)) is operatively connected to a protocol RIB (e.g., protocol RIB (106)). As used herein, a protocol RIB (e.g., protocol RIB (106)) may refer to any data structure storing any information that is available to a protocol agent (e.g., protocol agent (104)). Such information may include, but is not limited to, information related to neighbor devices, information related to all routes received by the protocol agent, and/or information about routes selected by protocol agent (104) as the best route to a given destination.

In one or more embodiments, protocol RIB (106) is a data structure stored in memory and/or persistent storage of network device (100). In one or more embodiments, information relating to a given route is stored as a protocol RIB entry in protocol RIB (106). In one or more embodiments, a protocol RIB entry may include any information related to a route. For example, a protocol RIB entry may include a destination subnet identifying a network, a next-hop to reach the network, an interface connected to the next-hop, various metrics about the route, and/or any other information relevant to the route. In one or more embodiments, protocol agent (104) manages the protocol RIB entries in protocol RIB (106), which may include adding entries, removing entries, and/or modifying entries. As an example, protocol RIB (106) may be in the form of a database, managed by protocol agent (104) with each entry in the database being a protocol RIB entry. In one or more embodiments, a protocol RIB is considered to be within the control and/or management plane of network device (100).

In one or more embodiments, at least one of the agents of network device (100) is RIB agent (102). In one or more embodiments, RIB agent (102) is an agent configured to centrally manage route information for network device (100). In one or more embodiments, managing route information includes, but is not limited to, receiving route candidates from various protocol agents (e.g., protocol agent (104)) and/or defined static routes, determining a winner from among such routes for a given destination, storing routes in a RIB (discussed below) programming routes to a FIB (discussed below), programming FECs with sets of next-hops, redistributing routes between protocols, etc. In one or more embodiments, RIB agent (102) has access to route information from routes stored in the RIB, and may request additional route information for other routes from, for example, protocol agents.

In one or more embodiments, RIB agent (102) and/or protocol agent (104) stores any amount of additional information that may be necessary to perform all or any portion of the function of route management.

Examples of such information include, but are not limited to: information regarding defined route policies (e.g., route maps) for use in managing routes; bandwidth; latency; path reliability; security issues in a network; monetary cost information associated with various autonomous systems;

information regarding loads on ports of network device (100) and/or load balancing information regarding the same; information regarding maximum transmission unit (MTU) size for a given path; hop count; upcoming maintenance of other network devices; whether other network devices are experiencing technical issues (e.g., power problems, wiring problems, etc.); whether given ports of network device (100) are experiencing technical issues (e.g., repetitively going down); geographic information related to various paths and/or autonomous systems; information relating to network load at various times of a day, week, month, year, etc.; information relating to entities providing access to or having control of given autonomous systems; which protocols are configured to be more trusted by network device (100); information regarding disruptions in internal networks; information regarding paths to devices implementing security policies in a network; information regarding blacklisted (or whitelisted) network prefixes and/or next-hops; information regarding access control lists, information regarding times at which certain routes, routing protocols, paths, next-hops, etc. are preferred over others; information relating to specificity of routes (e.g., using subnet masks); information relating to default routes; etc. Information available to RIB agent (102) and/or protocol agent (104) is not limited to the aforementioned examples.

In one or more embodiments, RIB agent (102) and protocol agent (104) are configured to manage routes based on one or more algorithms. For example, RIB agent (102) may be configured to select a route to install in a RIB from among a set of routes to a destination presented by various protocol agents (104) based on which route has a lowest administrative distance. In one or more embodiments, an administrative distance is an alpha-numeric unit (e.g., a number) assigned to a route, and may be based on any information relating to a route, may be presented to RIB agent (102) by routing protocol agent (104), may be assigned or modified by RIB agent (102), and/or any combination thereof. Values other than administrative distance may be used by RIB agent (102) for route management without departing from the scope of embodiments described herein.

In one or more embodiments, protocol agent (104) and RIB agent (102) are configured with one or more routing policies (e.g., route maps) to influence route management. For example, protocol agent (104) may be configured with policies for route selection for installing a route in protocol RIB (106), sharing a route with a neighbor, etc. Protocol agent (104) may be configured with policies other than the aforementioned examples without departing from the scope of embodiments described herein.

In one or more embodiments, protocol agent (104) and RIB agent (102) implement policies via application of route maps to routes. In one or more embodiments, a route map is a sequence of statements that is evaluated for routes by protocol agent (104) and/or RIB agent (102) receives and/or seeks to action on. In one or more embodiments, the statements of a route map, perform two basic functions: first a determination is made whether a route has a particular attribute (based on any of the above-described information available to protocol agent (104) and/or RIB agent (102)); second, if a route does have the particular attribute, an action may be performed. For example, such an action may be to set a particular attribute to a particular value (which may or may not be the same attribute that was matched on). In such an example, when a route has a particular attribute, protocol agent (104) may increase or decrease the administrative distance assigned to the route to influence whether it is selected to be presented to RIB agent (102), may alter the next-hop for the route, etc. There may be a list of such statements in a given route map, each of which are evaluated for the route.

As an example, BGP routes have an autonomous system path attribute, which is the set of autonomous systems that a network traffic data unit would need to traverse to reach a destination. In such a scenario, protocol agent (104) (e.g., a BGP agent) may receive two routes, one with five autonomous systems in the autonomous system path, and the other with 10 autonomous systems in the autonomous system path. RIB agent (102) may be configured with an algorithm that selects the route with the lowest number of autonomous systems in the autonomous system path attribute to add to protocol RIB (106), which, in this scenario, would be the route with five hops in the autonomous system path. However, in one or more embodiments, a route map may be applied to the routes to alter the behavior of protocol agent (104).

In such a route map, the first statement may be 'match neighbor autonomous system'. If the route is received from a particular neighbor (a 'match'), then protocol agent (104) would perform a set action in the route map to add ten to the autonomous system path value for that route. If the route with the autonomous system path attribute value of five path was from the matched neighbor autonomous system, then the adding of ten makes the attribute value fifteen, which is now higher than the route with an attribute value of ten. Once this action is performed, later, when protocol agent (104) performs a best route calculation algorithm, the route with an attribute value of ten is selected as the best route to install in protocol RIB (106) instead of the route with an original attribute value of five.

In one or more embodiments, a route map could also lower an attribute value, or manipulated any other attribute or set of attributes that the best route algorithm evaluates after application of the route map. As another example, protocol agent (104) may be configured to blacklist certain Internet Protocol (IP) addresses. In such an example, if a route was sent from IP prefix on blacklist, or has next-hop with IP prefix on blacklist, then protocol agent (104) may deny the route (i.e., drop it) or set some attribute to a value that guarantees that it will not be selected by a best route selection algorithm. In one or more embodiments, a route map applying a policy may be used to manipulate a route or filter a route by matching and/or manipulating any attribute related to the route that is available to protocol agent (104) and/or RIB agent (102).

In one or more embodiments, a route map is implemented in the running configuration network device (100), and is stored on persistent storage and/or memory of network device (100). In one or more embodiments, a route map is created by configuring a series of one or more match (does an attribute of a route match a criteria) and/or set (what action to perform relative to the route) statements, giving the route map a name, and configuring an agent (e.g., 102, 104) to use the route map. Therefore, in one or more embodiments, the match statements check if an attribute matches the statement, and may lead to a permit or deny of the route for consideration by the route selection algorithm, and, if permitted, set statements may modify an attribute of the route.

Although the foregoing description of a route map as the mechanism for applying policies relating to route management, one having ordinary skill in the art will recognize that an agent may use any scheme of assessing route attributes and other information, and taking actions related to routes, without departing from the scope of embodiments described herein. Accordingly, in one or more embodiments, policy configuration allows users to specify policies for each (managed) function of protocol agent (104) and/or RIB agent (102). In one or more embodiments, such policies serve as filters for actions performed by protocol agent (104) and/or RIB agent (102).

In one or more embodiments, RIB agent (102) is operatively connected to RIB (108). In one or more embodiments, a RIB is a data structure stored in memory and/or persistent storage of network device (100). In one or more embodiments, RIB (108) is a data structure that stores information related to routes, which may be statically configured, learned dynamically from a routing protocol agent (e.g., protocol agent A (104)), or relate to networks directly connected to network device (100). In one or more embodiments, information relating to a given route is stored as a RIB entry in RIB (108). In one or more embodiments, a RIB entry may include any information related to a route. Such information may include statically configured route information, dynamically learned route information, and/or any other information known to RIB agent (102) (discussed above). For example, a RIB entry may include a destination subnet identifying a network, a next-hop to reach the network, an interface connected to the next-hop, various metrics about the route, and/or any other information relevant to the route. In one or more embodiments, RIB agent (102) manages the RIB entries in RIB (108), which may include adding entries, removing entries, and/or modifying entries. As an example, RIB (108) may be in the form of a database, managed by RIB agent (102) with each entry in the database being a RIB entry. In one or more embodiments, a RIB is considered to be within the control and/or management plane of network device (100).

In one or more embodiments, RIB agent (102) is operatively connected to FIB (110). In one or more embodiments, FIB (110) is a data structure stored in storage of one or more hardware components of network device (100). In one or more embodiments, FIB (110) is a data structure that stores information related to how to send a network traffic data unit destined for a destination within a given network to an appropriate next-hop using the correct interface of network device (100). In one or more embodiments, such information relating a given destination network is stored as a FIB entry in FIB (110). In one or more embodiments, a FIB entry is based at least in part on a corresponding RIB entry, and may include all or any portion of the information stored in a RIB entry. For example, a FIB entry may include, but is not limited to, a destination subnet identifying a network, a next-hop to reach the network, and an interface connected to the next-hop. In one or more embodiments, FIB (110) is accessed to process network traffic data units received at network device (100) and, if possible, identify the egress interface out of which the network traffic data unit should be sent to reach a given next-hop, if possible. In one or more embodiments, RIB agent (102) manages the FIB entries in FIB (110), which may include adding entries, removing entries, and/or modifying entries. As an example, FIB (110) may be in the form of a content addressable memory (CAM) table, managed by RIB agent (102) with each entry in the table being a FIB entry. In one or more embodiments, FIB (110) is considered to be within the data or forwarding plane of network device (100).

In one or more embodiments, network device (100) includes command handler (112). In one or more embodiments, command handler (112) is any hardware (e.g., circuitry), software, firmware, or any combination thereof that includes functionality to receive and execute a command. Such a command may be, for example, a CLI command entered by a network device user into a console window displayed to the user during a connection to a management port of network device (100). A command may be any sequence of characters that network device (100) is configured to recognize and execute using command handler (112). In one or more embodiments, a command includes an instruction to perform one or more actions, and may include any number of options, which may specify various parameters that are used by command handler (112) during execution of the command. In one or more embodiments, once a command is input (e.g., by a local or remote user), command handler (112) determines if the form of the command is valid and, if so, parses the command to determine what one or more actions to perform, and then causes performance of the one or more actions using the specified options, if any. In one or more embodiments, if one or more options are not specified when a command is entered, command handler (112) is configured to perform the action using a configured default value for the missing option.

While FIG. 1 shows a configuration of components, other configurations may be used without departing from the scope of embodiments described herein. For example, a network device may include any number of agents. As another example, a network device may include any number of FIBs. As another example, a network device may include any number of RIBs. As another example, a network device may include any number of components not shown in FIG. 1. Accordingly, embodiments disclosed herein should not be limited to the configuration of components shown in FIG. 1.

Figure 2:
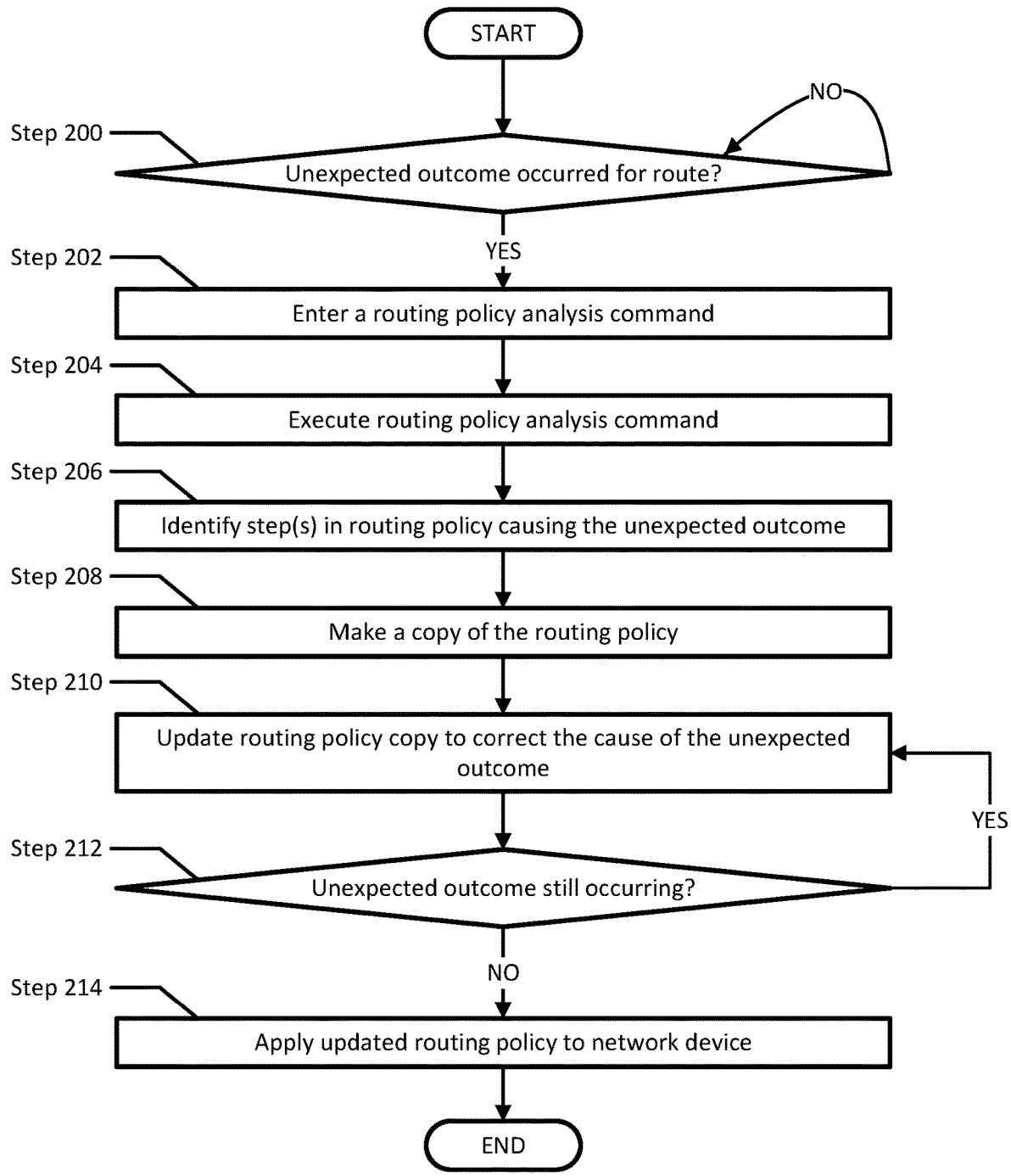
FIG. 2 shows a flowchart in accordance with one or more embodiments described herein.

FIG. 2 shows a flowchart describing a method for performing an analysis of applying a route policy to one or more routes. The method for such route management shown in FIG. 2 is only one example of a particular scheme for route management. Accordingly, embodiments described herein should not be considered limited to the information sharing topology creation and use shown in FIG. 2.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, and/or that other steps than what is shown in FIG. 2 may be performed in accordance with embodiments described herein.

In Step 200, a determination is made whether an unexpected outcome has occurred related to a given route. Examples of unexpected outcomes include, but are not limited to: a network device user expecting a network device to have a route to a particular destination in one or more locations of the network device (e.g., a protocol RIB, a RIB, etc.); a network device user expecting a route from a particular neighbor not to exist on a network device, but the route does exist; a route having been modified in an unexpected way; a route that a network device user expects to have been modified a certain way not being so modified; a route being shared with a peer device that was not supposed to be shared; a route not being shared with a peer device that should have been shared; a route shared with a peer device having or not having an expected modification, or any combination thereof. Other unexpected outcomes relating to a given route may be identified in Step 200 without departing from the scope of embodiments described herein.

In one or more embodiments, the determination of Step 200 is made using any scheme for assessing whether an unexpected outcome has occurred relating to a given route. For example, a network device user may examine a protocol RIB, and discover that a route from a particular prefix in a path received from a particular neighbor, and expect that the route was presented to a RIB agent, and was processed by the RIB agent and installed in the RIB. However, the route is not in the RIB, which is an unexpected outcome. In one or more embodiments, if no unexpected outcome has occurred, the method remains at Step 200 to continue to check for unexpected outcomes relating to one or more routes. In one or more embodiments, if an unexpected outcome has occurred, the method proceeds to Step 202

In Step 202, a routing policy analysis command is entered. In one or more embodiments, the routing policy analysis command is entered by a network device user that has become aware that an unexpected outcome occurred relating to a route, as determined in Step 200. In one or more embodiments, the routing policy analysis command may include text for causing a command handler of a network device to analyze the routing policy, a prefix of a route to be analyzed, and may include options to be used during the analysis. Such options may include, but are not limited to, the point of application of the routing policy (e.g., inbound or outbound), the neighbor (e.g., BGP peer) the path was received from (or no neighbor information to analyze routes from all neighbors), a VRF (or no VRF to analyze all VRFs), a name of the routing policy (or no name to allow command to automatically determine route map(s) applied to the route having the entered prefix), or any route attributes (e.g., ipv4, ipv6, unicast, multicast, broadcast, etc.)

In one or more embodiments, routing policy analysis may be initiated by entering the command and may be executed for any routing policy that can be executed for a route by any entity of a network device during processing of a route, such as a protocol agent or a RIB agent.

As an example, a network device user may enter a routing policy analysis command for analyzing a route map, and specify the prefix for the route to be analyzed, the name of the route map, the BGP neighbor the route was received from, that the route is an ipv4 route, that the route is a unicast route, and an identifier of a VRF.

In Step 204, the command entered in Step 202 is executed. In one or more embodiments, a command is executed by a command handler of a network device. In one or more embodiments, the command handler accepts the command, verifies that the command is valid, parses the command to obtain the prefix and various options, and execute the command. In one or more embodiments, executing the command includes collects appropriate information from the relevant agent (e.g., BGP agent, RIB agent, etc.), such as, for example, route information and/or the routing policy (e.g., route map) that was applied to the route.

In one or more embodiments, as discussed above in the description of FIG. 1, a routing policy is any policy in any form that provides information related to how to assess a given route or sent of routes and/or take actions related to the route or set of routes. In one or more embodiments, the routing policy is a series of match and set statements. As an example, a routing policy may be in the form of a route map.

In one or more embodiments, once the appropriate information from the relevant agent is obtained, the code path of the routing policy (e.g., route map) is simulated to determine what happens at each step (e.g., each route map sequence) during evaluation of the routing policy. The results are then displayed to the network device user (e.g., in a console window). As an example, the results may include, but are not limited to, the prefix of the route, the peer device from which the route was received, and the results of each step of the routing policy. Examples of the results of the steps may include, but are not limited to, whether any match statements matched or not, whether any set statements were triggered, the results of calling a sub-route map, and what happened after the route map sequence was completed (e.g., moved to next sequence in a route map).

In Step 206, based on execution of the routing policy analysis performed in Step 204, a network device user identifies one or more steps performed during execution of the routing policy that caused the unexpected outcome identified in Step 200. In one or more embodiments, identification of the one or more steps includes analyzing the output displayed by the execution of the routing policy application analysis and determining the specific step or steps that led to the unexpected outcome for the route identified by the prefix entered as part of the command entered in Step 202 and executed in Step 204.

For example, network device a user may have expected that a route would be installed in a RIB. In response to the route not being installed in the RIB, the network device user checks the BGP RIB, and finds the route was received from a peer device. Based on this discovery, the network device user enters the routing policy analysis command for a route map that the BGP agent applied to the route. The results displayed to the network device user indicate that there was a match in the route map on routes having a certain autonomous system in the AS_path attribute of the received route. The network device user intended for an attribute for the route used in the best route selection algorithm of the BGP agent to have the value of the attribute reduced by the application of the route map to the route. Instead, the user finds that the attribute value was tripled, thereby severely reducing the chance that the route was selected for presentation to the RIB agent as the best path to the destination offered by the BGP agent. Accordingly, the route was not presented to the RIB agent, and therefore not added to the RIB.

In Step 208, based on the identification of the step(s) in the routing policy causing the unexpected outcome relating to the route analyzed by execution of the routing policy analysis command in Step 204, a copy of the touting policy is made. In one or more embodiments, the copy is made by a network device user. In one or more embodiments, making a copy allows the user to make updates to the routing policy without affecting the use of the original routing policy by the running network device.

In Step 210, updates are made to the copy of the routing policy created in Step 208 to correct the one or more steps in the routing policy that were identified in Step 206 as the cause of the unexpected outcome related to the route identified by the prefix in the command entered in Step 202. In one or more embodiments, updating the copy of the routing policy rather than the actual routing policy provides the opportunity to try various updates without otherwise affecting the operation of a network device. In one or more embodiments, updating the routing policy includes modifying one or more steps of the routing policy in an attempt to have application of the routing policy to a given route result in an expected outcome instead of the unexpected outcome.

In Step 212, a determination is made as to whether the unexpected outcome is still occurring when the copy of the routing policy is applied to the route. In one or more embodiments, the determination is made by re-executing the routing policy analysis command previously executed in Step 204, but on the copy of the routing policy rather than the actual routing policy. In one or more embodiments, just as in the original execution, the simulated execution of the routing policy for a given route displays the results of the execution to a network device user, who may then analyze the results to identify that the unexpected error does or does not occur. In one or more embodiments, the network device user may also review the results to determine if the one or more updates made to the copy of the routing policy in Step 210 introduced any other unexpected outcomes. In one or more embodiments, if no unexpected outcomes are occurring when the command executes a simulation of application of the routing policy to the copy of the routing policy, the method proceeds to Step 214. In one or more embodiments, when the original unexpected outcome is still occurring, and/or any new unexpected outcomes are occurring, the method returns to Step 210, and the routing policy is further updated.

In Step 214, the updated, unexpected outcome-free routing policy is applied to the network device to replace the flawed routing policy previously being applied to one or more routes received by or to be sent from a network device. In one or more embodiments, application of the updated routing policy causes the agent of the network device that caused the unexpected outcome to use a new routing policy for one or more routes which, in turn, causes the one or more routes to be treated appropriately on an on-going basis.

Figure 3:
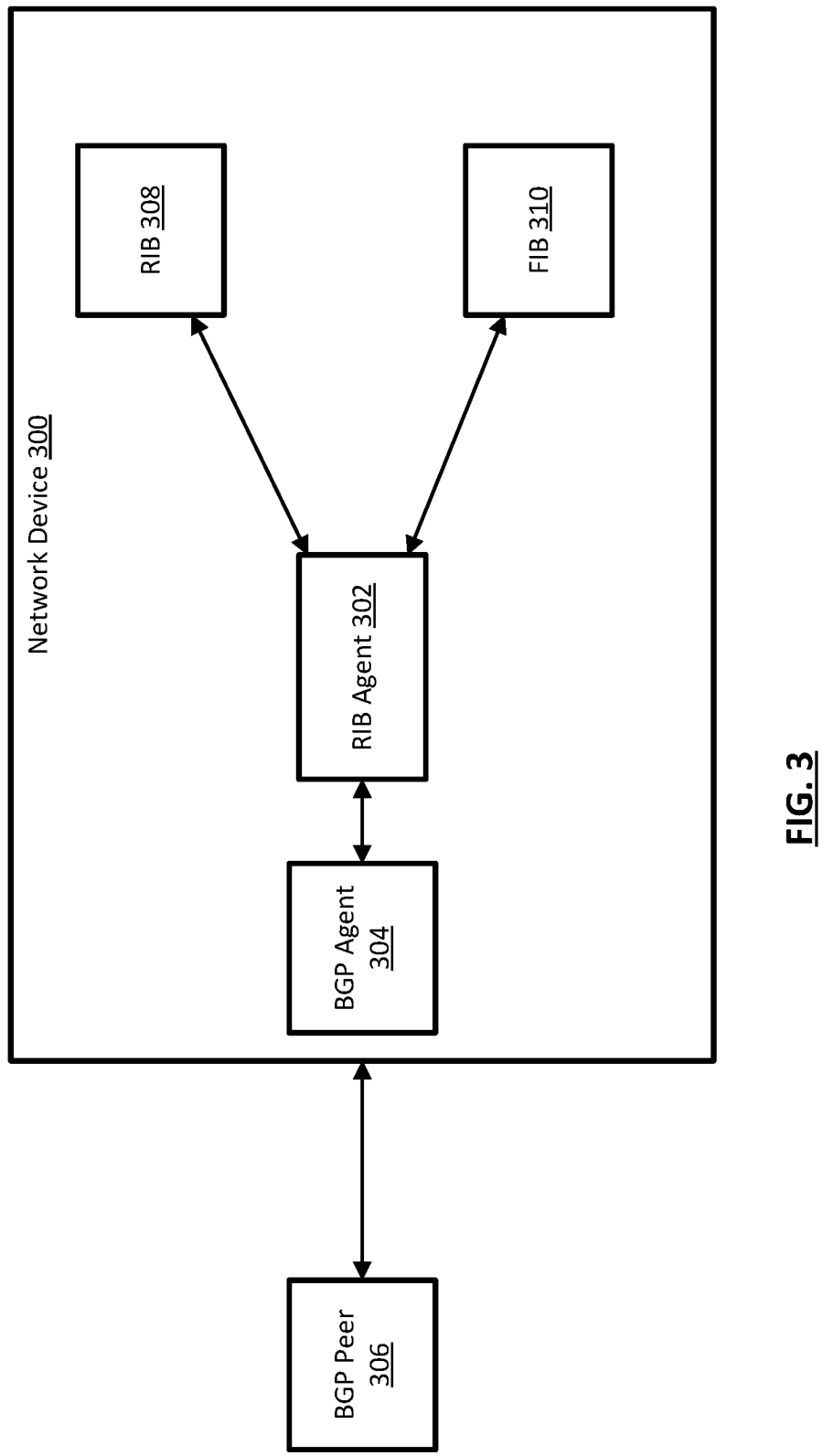
FIG. 3 shows an example in accordance with one or more embodiments of described herein.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3, consider a scenario in which network device (300) includes RIB agent (302). RIB agent (302) is operatively connected to BGP agent (304), RIB (308), and FIB (310). Network device (300) is operatively connected to BGP peer (306). The peer relationship with BGP peer (306) is managed, at least in part, by BGP agent (304). In such a scenario, BGP agent (304) is configured with several routing policies expressed as route maps, including a policy for routes received from BGP peer (306).

At a first time, a user of network device (300) has applied a route map for application by BGP agent (304). The route map includes a variety of match and set statements, as well as calls to sub-route maps.

Next, a route is received from BGP peer (306). Therefore, BGP agent (304) applies the route map. One match statement in the route map created by the network device user is intended to match on a particular autonomous system in the AS_path attribute of the route information that network device (300) does not want, under most circumstances, to send a network traffic data unit to or through, as that particular autonomous system is very expensive monetarily to use in routing network traffic data units. The network device user configuring the route map is willing to allow use of the more expensive autonomous system only in circumstances where the number of autonomous systems in the path is two or less, and creates a sub-route map for application to routes from BGP peer (306), which will be called by the route map for BGP peer (306), and can be re-used for route maps created for other BGP neighbors (not shown)

Continuing the scenario, the received route has the autonomous system present in the AS_path attribute, leading to a match in the relevant sequence of the route map being applied by BGP agent (304). Because a match happened in that particular sequence of the route map, the sub-route map is called that performs additional assessment of the route.

The sub-route map is intended by the network device user a match statement that matches on the number of hops ion the path of autonomous systems identified in the AS_path attribute. If the number of hops is two or less, then the sub-route map returns that the route should be permitted. Otherwise the route should be denied. However, the network device user accidentally set the number of hops in the match statement in the sub-route map to 200 instead of two. The received route has a hop count of administrative systems of five, and therefore should have been denied. However, due to the error in hop count made by the network device user, the route is permitted, and assessed by the best route selection algorithm of the BGP agent, and is selected as the best route.

Next, having been selected by the best route algorithm of BGP agent (304), the route is presented to RIB agent (302) for consideration. The best route selection algorithm of the RIB agent then selects the route as the best available route to the destination based on its administrative distance being lower than other routes presented for consideration by other routing protocol agents (not shown). Accordingly, the route is installed in RIB (308) and, subsequently, in FIB (310).

Next, the network device user notices that they are receiving higher than expected bills from the service provider in control of the autonomous system that the match statement in the route map and call to the sub-route map was intended to minimize the sending of network traffic data units to. In response, the network device user assesses the RIB and determines that the route is present, but that the route information indicates that the route does not conform to the constraints the network device user intended to apply to the route.

The network device user then realizes the route should have been rejected during application of the route map for BGP peer (306) applied by BGP agent (304). Therefore, the network device user enters a routing policy analysis command to analyze the route map. The command includes "show BGP debug", which is a text string indicating to a command handler to execute the command to analyze a route map. The command also specifies the prefix included in the route information for the route. The command also specifies as options that the route is a unicast ipv4 route, the name of the route map that was applied, the IP address of the neighbor from which the route was received, and an identifier of a VRF for the route.

Next, the command handler obtains the route information related to the route from the BGP agent, as well as the route map that was applied. Then, the command handler simulates the series of sequences (i.e., match statements, set statements, and calls to sub-route maps) included in the route map.

Next, the results of the simulation are displayed to the network device user in a console window in which the network device user entered the command. The results first identify the prefix for the route, the peer device from which the route was received, and the name of the route map that was analyzed.

Next, the network device user analyzes the results, and determines that the route that was unexpectedly allowed to pass to RIB agent (302), get installed in RIB (308), and ultimately added to FIB (310), was permitted by the sub-route map that should have denied the route because the number of autonomous systems listed in the AS_path attribute was greater than 2 Therefore, the network device user accesses the sub-route map, and notices that the number of autonomous systems is 200 instead of two. Accordingly, the network device user makes a copy of the sub-route map, and updates the sub-route map copy to include two instead of 200. The network device user then also makes a copy of the route map that calls the sub-route map.

Next, the network device user re-executes the routing policy analysis command with the same parameters, except on the route map copy instead of the original route map, which is still being used by agents of network device (300). Once the results of the command execution are displayed, the network device user is able to verify that the new route map correctly denies the route in question. Based on the successful verification, the network device user applies the new route map in place of the old route map, leading to the elimination of the identified unexpected outcome.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While a limited number of embodiments have been described herein, those skilled in the art, having benefit of this disclosure, will appreciate that other embodiments can be devised which do not depart from the scope of the embodiments described herein. Accordingly, the scope of embodiments described herein should be limited only by the attached claims.

What is claimed is:

1. A method for performing an analysis of application of a route map to a route, the method comprising:
   receiving, by a command handler, a first route map analysis command to analyze a route map copy in response to a first determination, wherein the first route map analysis command comprises a route prefix of the route, a set of route information options, and a name of the route map copy applied to the route by an agent of a network device;
   copying the route map to obtain the route map copy based on receiving the first route map analysis command, wherein the route map copy comprises a plurality of route map sequences of the route map;
   executing, by the command handler, the first route map analysis command to simulate a first application of the route map on the route to obtain results;
   displaying the results of the first route map analysis command, wherein the results comprise a plurality of executed route map sequences of the route map;
   receiving an update action set to obtain an updated route map copy;
   receiving a second route map analysis command to analyze the updated route map copy after performing the update action set;
   executing, by the command handler, the second route map analysis command to simulate a second application of the updated route map copy on the route;
   displaying second results of the second route map analysis command, wherein the second results comprise a second plurality of executed route map sequences of the updated route map copy; and
   replacing the route map with the updated route map copy.

2. The method of claim 1, wherein the update action set comprises:
   modifying the route map copy based on the results.

3. The method of claim 1, wherein the set of route information options comprises one selected from a group consisting of a route direction option, a routing protocol neighbor identifier, a route attribute, and a virtual routing and forwarding (VRF) instance identifier.

4. The method of claim 1, wherein the plurality of route map sequences of the route map comprises a match statement.

5. The method of claim 4, wherein the updated action set is received in response to the match statement returning a deny route result.

6. The method of claim 1, wherein the route map comprises a call to a sub-route map.

7. The method of claim 6, wherein the updated action set is received in response to an evaluation of the sub-route map causing the route to be allowed.

8. A non-transitory computer readable medium comprising instructions that, when executed by a processor, perform a method for performing an analysis of application of a routing policy to a route, the method comprising:
   receiving, by a command handler, a first routing policy analysis command to analyze the routing policy for the route;
   obtaining the routing policy in response to receiving the first routing policy analysis command;
   making a copy of the routing policy to obtain a routing policy copy;

executing, by the command handler, the first routing policy analysis command to simulate a first application of the routing policy copy on the route to obtain results; and receiving an update action set to update the routing policy based on the results.

9. The non-transitory computer readable medium of claim 8, wherein performing the update action set comprises:

copying the routing policy copy to obtain a second routing policy copy;

receiving a modification to the second routing policy copy based on the results;

receiving a second routing policy analysis command in response to a first determination, wherein the second routing policy analysis command comprises a route prefix of the route, a set of route information options, and a second name of the second routing policy copy;

executing, by the command handler, the second routing policy analysis command to simulate a second evaluation of the second routing policy copy on the route; and applying the routing policy copy to a network device in response to the execution of the second routing policy analysis command.

10. The non-transitory computer readable medium of claim 8, wherein the set of route information options comprises one selected from a group consisting of a route direction option, a routing protocol neighbor identifier, a route attribute, and a virtual routing and forwarding (VRF) instance identifier.

11. The non-transitory computer readable medium of claim 8, wherein the routing policy comprises a match statement.

12. The non-transitory computer readable medium of claim 11, wherein the match statement causes the route to be denied.

13. The non-transitory computer readable medium of claim 8, wherein the routing policy comprises a call to a sub-routing policy step.

14. The non-transitory computer readable medium of claim 13, wherein evaluation of the sub-routing policy step causes the route to be allowed.

15. A method for performing an analysis of application of a routing policy to a route, the method comprising:

receiving a first routing policy analysis command to analyze the routing policy for the route;

executing the first routing policy analysis command to simulate a first application of the routing policy on the route;

displaying results of the first routing policy analysis command, wherein the results comprise a plurality of results comprising outcomes of steps within the routing policy;

copying the routing policy to obtain a routing policy copy after displaying the results;

modifying the routing policy copy based on the results;

receiving a second routing policy analysis command, wherein the second routing policy analysis command comprises a route prefix, a set of route information options, and a second name of the routing policy copy;

executing, by a command handler, the second routing policy analysis command to simulate a second evaluation of the routing policy copy on the route; and applying the routing policy copy to a network device in response to the second evaluation.

16. The method of claim 15, wherein the set of route information options comprises one selected from a group consisting of a route direction option, a routing protocol neighbor identifier, a route attribute, and a virtual routing and forwarding (VRF) instance identifier.

17. The method of claim 15, wherein the routing policy comprises a match statement that causes the route to be denied.

18. The method of claim 15, wherein the routing policy comprises a call to a sub-routing policy step.

19. The method of claim 18, wherein evaluation of the sub-routing policy step causes the route to be allowed.

* * * * *